July 31, 1962 — E. LAKATOS ET AL — 3,047,822
WAVE COMMUNICATING DEVICE
Filed Dec. 23, 1957 — 3 Sheets-Sheet 1

Emory Lakatos
Earl M. Polzin
James E. Holland
INVENTORS
BY Morris Spector,
ATTORNEY
Frederick Marbuckle
AGENT July 31, 1962  E. LAKATOS ET AL  3,047,822
WAVE COMMUNICATING DEVICE
Filed Dec. 23, 1957  3 Sheets-Sheet 2
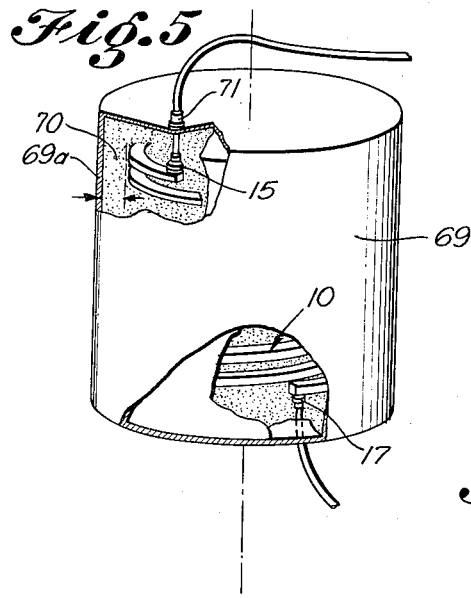
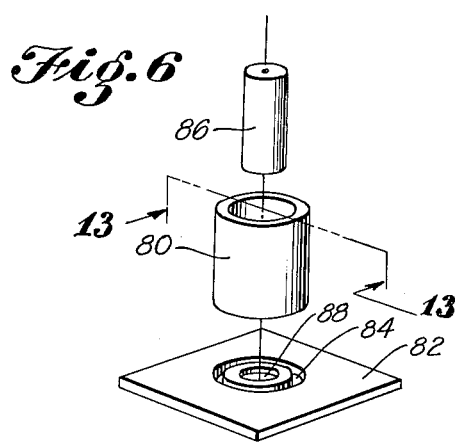
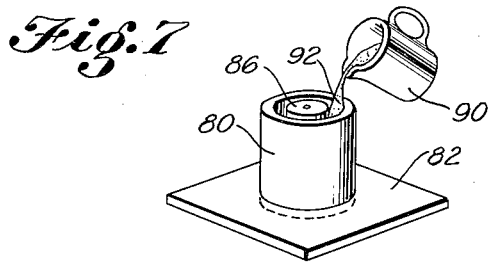
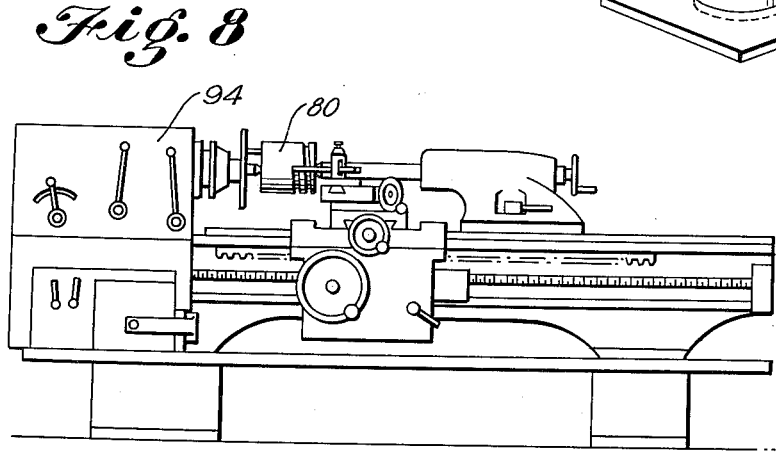
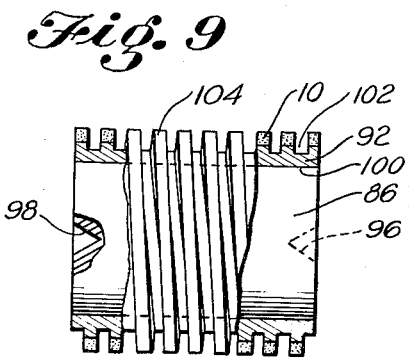
Emory Lakatos
Earl M. Polzin
James E. Holland
INVENTORS
BY *Morris Spector*,
ATTORNEY
*Frederick M. Arbuckle*
AGENT July 31, 1962     E. LAKATOS ET AL     3,047,822
WAVE COMMUNICATING DEVICE
Filed Dec. 23, 1957     3 Sheets-Sheet 3

Emory Lakatos
Earl M. Polzin
James E. Holland
INVENTOR.

BY Morris Spector,
ATTORNEY

Frederick M Arbuckle
AGENT

United States Patent Office 3,047,822
Patented July 31, 1962

3,047,822
WAVE COMMUNICATING DEVICE
Emory Lakatos, Santa Monica, James E. Holland, Los Angeles, and Earl M. Polzin, Lawndale, Calif., assignors, by mesne assignments, to Thompson Ramo Wooldridge Inc., Cleveland, Ohio, a corporation of Ohio
Filed Dec. 23, 1957, Ser. No. 704,443
4 Claims. (Cl. 333—31)

The present invention relates to improvements in apparatus for containing and directing electromagnetic waves and to improving the methods of manufacturing and fabricating new and useful electromagnetic wave directing devices, especially for use in imposing predetermined values of time delay upon signal information conditionally borne or represented by electromagnetic waves.

In present-day communications and other electronic systems employing energy in the form of electromagnetic waves, it is often necessary to provide means for effectively coupling such energy between elements of an overall system. In general, it is desired to effectuate this coupling with a minimum of loss and in a manner imposing a minimum of distortion upon the information borne or represented by the electromagnetic wave energy. To do this, such coupling means frequently have to handle a rather wide frequency bandwidth and be capable of efficiently communicating signal frequencies in the order of several thousand megacycles or higher. Many times the electrical length of such coupling means is made purposely large to impose predetermined values of time delay upon information carried by the wave energy. In such cases, excessive and almost intolerable magnitudes of energy loss are encountered, especially where large values of signal delay are desired.

In the past it has been common to employ coaxial lines and various forms of electromagnetic waveguides as means for containing, guiding, directing, coupling or delaying signal information in the form of electromagnetic radiation. Wave propagation along a coaxial line in a TEM (transverse electric magnetic field) mode is frequently used for the above purposes since an ideal TEM mode of wave propagation imposes no phase velocity variations in the signal components as a function of frequency. Such transmission is generally described as dispersionless. However, most types of coaxial line are quite costly, bulky and heavy and, therefore, because of their physical characterisitics, in some cases, leave much to be desired where cost, bulk and weight are important considerations.

On the other hand, known forms of waveguides employ an elongated container of cylindrical or multisided cross-section which, in the general case, comprises a rectangular metallic tube or pipe containing a gas having a relatively low dielectric constant, such as air. The walls of such tubular waveguides have in the prior art been always made of an electrically conductive material to more fully contain the wave energy and thus reduce energy losses attributable to stray radiation. Due to the conductive nature of the walls forming such waveguide tubes, propagation of waves in the TEM mode is impossible and hence reliance must be placed upon other modes of propagation such as TE and TM. Dispersionless propagation in the TE and TM modes has not been found possible in tubular waveguides so that wideband signals are subject to considerable phase distortion. Moreover, the practical bandwidth of such waveguides is generally only 40% which, in many cases, seriously restricts the amount of signal information a given waveguide is capable of communicating. Finally, knows forms of waveguides impose serious physical problems where size and weight are important factors, since the dimensions of a given waveguide increase with the wavelength of the signals it is to propagate and this wavelength, being based on the velocity of the wave in a low dielectric gas such as air, may be quite large.

The present invention overcomes many of the above-mentioned limitations of the prior art wave-containing and guiding communication devices through the provision of a light-weight waveguide structure based upon a body of solid material having a high electrical resistivity and also a high dielectric constant relative to the dielectric constant of the atmosphere or environment in which the waveguide, as a device, is to be utilized. Advantage is taken of the reflective containment of wave energy within the body at its boundaries, attributable to the disparity between its dielectric constant and that of its environment. This reflection is caused to effectuate a unique form of wave propagation which partakes of the dispersionless characteristics of wave propagation in the TEM mode yet permits the combination of this mode with TE and/or TM modes to provide a new and useful form of waveguide having a band pass characteristic in the order of 60%.

In one embodiment of the present invention, a waveguide device is provided in the form of an elongated body of cylindrical multisided or rectangular cross-section comprised of a ceramic material having a relatively high dielectric constant with respect to the dielectric constant of air, and also characterized by a relatively high resistivity. The cross-sectional shape of the body may conveniently be made rectangular with opposing surfaces of the body supporting electrically conductive plates insulated from one another by the ceramic material, with the plates lying in planes substantially parallel to one another. The electromagnetic wave energy to be communicated is then coupled in a unique manner to one extremity of the body so as to excite the propagation of electric wave energy along the length of the body. By establishing the dielectric constant of the ceramic material at a value sufficiently high with respect to air or the operating environment in which the waveguide device is to be utilized, substantial reflection of wave energy within the body is enforced. This reflection occurs at the boundary of the ceramic material and its operating environment and is characteristic of TE and TM wave propagation modes. On the other hand, inasmuch as the ceramic material is highly resistive, a substantial electric field potential may exist at its boundaries which permits a propagation mode of TEM type. A complex of propagational modes within the body of the waveguide may, therefore, be sustained and, since substantial electric field potential may be tolerated at the boundaries of the ceramic material and its environment, wave propagation partaking mainly of the dispersionless TEM mode may be realized.

In a preferred form of the present invention, the elongated body of ceramic material is conformed in shape to that of a helix with the conductive plates affixed to those surfaces of the body lying substantially in planes generally transverse to the axis of the helix.

A novel aspect of the present invention also resides in the technique for fabricating a helix of material having a high dielectric constant. High dielectric, low loss materials known in the art are many times characterized by substantial brittleness and hardness, such as the ceramic material known as titanium dioxide. The fashioning of such material into a helix of high dimensional tolerance, therefore, becomes difficult.

In accordance with the present invention, a helix of hard, brittle material such as the ceramic titanium dioxide may be fabricated by novel machining and handling techniques in which a hollow cylinder of the ceramic material is supported on a mandrel of relatively soft, easily-machined material which forms an easily-destroyed temporary bond with the cylinder. The material comprising the cylinder is then cut or ground away while rotating the cylinder about its axis to result in a helix supported by the material comprising the mandrel. Upon destroying the bond between the helix and the material comprising the mandrel, a helix of hard, brittle material results.

The novel features of the present invention and their advantages will be better understood through a reading of the following description, especially when considered in connection with the accompanying drawings, in which:

FIGURE 5 is a perspective view, partially cut away, showing one way of mounting the helical body of FIGURE 1 within a metallic container for shielding purposes;

FIGURE 6 is an exploded view illustrating steps, in accordance with the present invention, utilized in fabricating the helical body shown in FIGURE 1;

FIGURE 7 is a diagrammatic representation of another step employed, in accordance with the present invention, to fabricate the helical body shown in FIGURE 1;

FIGURE 8 is a diagrammatic representation of still another step employed in fabricating the helical body in FIGURE 1;

FIGURE 9 is a partially cut-away elevational view with cross-sectional representation depicting one stage of the development of a helical body of the type shown in FIGURE 1;

As briefly stated hereinabove, the present invention provides a novel form of waveguide for electromagnetic wave energy which can be used for directing and containing electromagnetic wave energy for various purposes. The advantages which flow from the practice of the present invention will perhaps be most clearly realized when considering its use in making apparatus for imposing predetermined values of time delay upon signal information carried by wideband electromagnetic wave energy. The following detailed description of the present invention will deal mainly with a specific embodiment of the present invention in a helical waveguide which may be employed as a light-weight, low-volume and relatively low-cost device for imposing substantial delays upon electromagnetic wave energy over a large range of frequencies which extend well above several thousand megacycles per second. It will be readily understood, however, that the principles of the present invention are in no way limited to waveguide devices of any particular cross-sectional shape, nor to the manner in which such waveguide devices are bent, curved or otherwise arranged in various forms such as helices, spirals, etc., nor the uses to which said waveguide devices are to be put.

Figure 1:
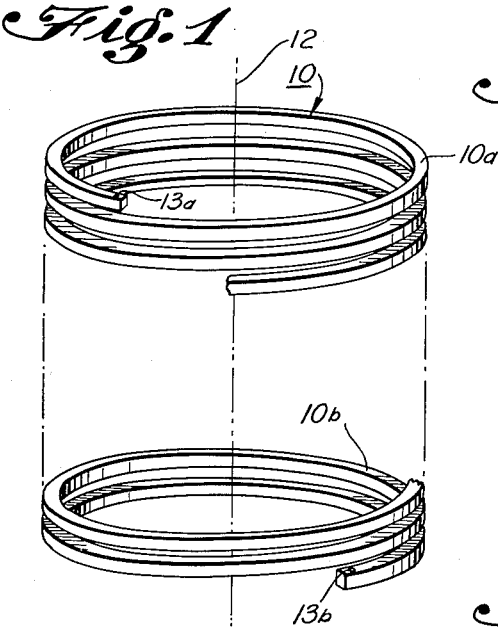
FIGURE 1 is a perspective view of a section of a solid body of high dielectric material conformed to the shape of a continuous helix and suitable for use in the practice of the present invention.

With particular reference, therefore, to a novel form of helical waveguide for producing time delays in information carried by electromagnetic wave energy, attention is now directed to the showing of FIGURE 1.

In FIGURE 1 there is depicted an elongated solid body of ceramic material 10 conformed to the general shape of a continuous helix of predetermined length having an axis indicated by the broken line 12. The body 10 is, by way of illustration, shown to be of rectangular cross-section and is conveniently shown in two separate sections 10a and 10b since the length of the body or helix may be made of any desired value. It is this elongated ceramic body when formed of a material having a high resistivity and high dielectric constant which forms a basic part of one embodiment of the present invention. In practice it is desired that the body 10 be comprised of a material having a high resistivity and relatively high dielectric constant relative to the atmosphere or environment in which the waveguide of the present invention is to be employed. One type of material found especially suited to the practice of the present invention is known as titanium dioxide and is characterized by a high electrical resistivity and high dielectric constant as well as high mechanical hardness and brittleness. At each extremity of the helical body there is indicated an aperture such as 13a and 13b. These apertures, as will later be seen, form a part of novel means for launching electromagnetic waves along the body of the helix in accordance with the present invention.

In order to adapt the body of material 10 for use as a containing guide for electromagnetic wave energy, two opposing surfaces of the body are, in accordance with the present invention, so treated as to become conductive to electric current. This may be done by applying electrically conductive paint such as a suspended solution of silver, copper, aluminum, or other metal, along with a binding agent such as glass, to opposing surfaces of the helical body 10. After the application of the paint, the body may be baked at high temperature or otherwise treated to form a uniformly distributed layer or plate of metal which is fixed to the ceramic. In a preferred form of the present invention, those surfaces of the body 10 which lie in helical surfaces turning about the axis 12 of the helix, are treated in this or an equivalent manner to result in a structure in which two parallel electrically conductive plates are separated by a body of ceramic or high dielectric material with uniform spacing between the plates throughout the length of the body.

Figure 2:
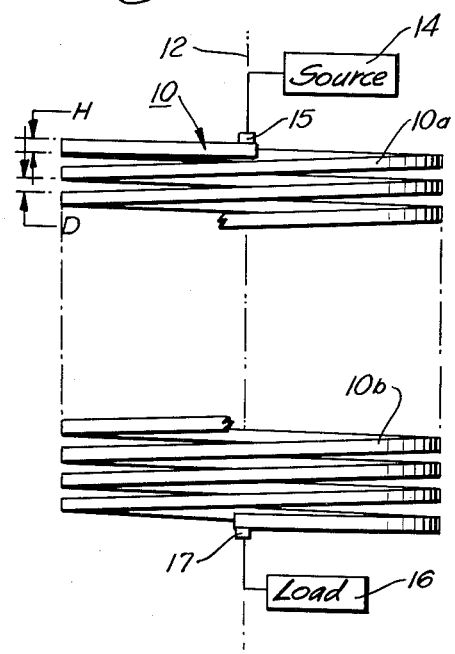
FIGURE 2 is an elevational view of the sections of the helical body shown in FIGURE 1, with a diagrammatic indication of its adaptation as a delay line for use with electromagnetic radiation energy.

As shown in FIGURE 2, after the two surfaces of the helical body have been rendered conductive, electromagnetic wave energy may be coupled to one end of the body and utilized by suitable load means coupled to the other extremity of the body. In FIGURE 2, a source of electromagnetic wave energy 14 is suitably coupled to the waveguide comprised of the body 10 through the agency of a coupling means indicated at 15, while the wave after propagation through the body 10 is coupled to a load 16 by means of a coupling device 17.

Figure 3:
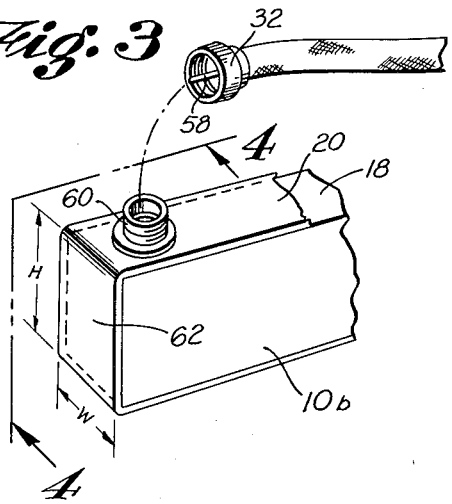
FIGURE 3 is a perspective view in detail of one end of a helical body of the type shown in FIGURE 1, adapted to receive wave energy in accordance with the present invention.
Figure 4:
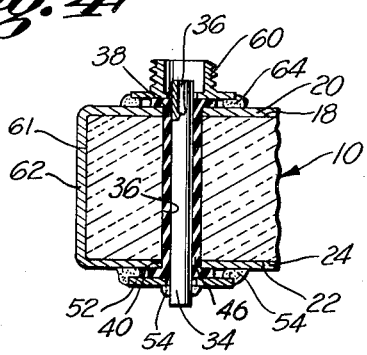
FIGURE 4 is a cross-sectional view of the arrangement shown in FIGURE 3 taken in a plane containing lines 4—4 thereof.

Constructional details of one form of waveguide embodying the present invention and one way, for example, of coupling energy to it is shown in greater detail in FIGURE 3 and FIGURE 4. In these figures, that portion of the body 10 broken away from the main helix in FIGURE 1 near the extremity of section 10b adjacent aperture 13b is depicted along with novel wave energy coupling means. In FIGURE 3, the body 10 is shown to have applied or affixed to its upper surface 18 a metal film coating or electrically conductive plate 20 which is applied or affixed to the body in a manner maintaining intimate contact of the plate with all areas of the surface 18. This is also shown in FIGURE 4. On the opposing surface 22 of the body 10 there is similarly affixed another conductive member 24 in the form of a film coating or plate and also in intimate contact with all areas of this surface.

The actual launching of an electromagnetic wave along a solid body such as the body 10 forms another aspect of the present invention. In order to accomplish this with good efficiency, an electrically conductive means is effectively embedded, planted or inserted into the dielectric material for electrically exciting the dielectric. This may be done by means of a recess, cavity, aperture, or hole in the body 10, which in one form of the present invention extends between those surfaces of the body which support the two conductive plates 20 and 24. By way of example, aperture 13b serves this purpose. An electrical conductor which may take the form of a cylindrical rod, tube or pin 34 may then be inserted into the aperture 13b through a suitable opening in one of the conductive plates such as 20. This opening is, of course, in substantial alignment with the aperture 13b of the body 10. In the particular coupling arrangement shown, the pin 34 also extends through a similar opening in the other plate 24. The walls of the aperture 13b are indicated at 36 while the walls of the apertures in the plates 20 and 24 are shown at 38 and 40, respectively.

In the practice of the present invention, it is found that the surface of the conductive pin 34 must be maintained in substantially uniform coupling relation to the walls 36 of the aperture 13b. This may be accomplished by enforcing very close fitting between the pin 34 and the walls of the aperture to ensure uniform intimate contact of the pin surface with the dielectric material. On the other hand, a uniform coating of conductive material may be deposited on the walls of the aperture in lieu of or to supplement the pin. However, in one preferred form of the present invention the diameter of the aperture 13b is made quite large relative to the diameter of the pin and an insulating sheath 46 is provided around the pin 34 to maintain mechanically supported uniform spacing between the pin and the walls of the aperture. It is further preferred that in this arrangement the diameter of the aperture should be at least 1.5 times the diameter of the pin. In this way small deviations in the positioning of the pin from absolute concentricity within and with respect to the aperture 36 do not produce serious losses in the energy to be coupled to the waveguide. On the other hand, the sheath 46 affords convenient means for insulating the pin from the plate 20. The pin 34 may then be connected to plate 24 by means of riveting, soldering or other fastening techniques to afford electrical contact therewith. In FIGURE 4 this has been illustrated as being accomplished by the aplication of solder to both the pin 34 and a metallic washer 52, which is in turn fastened by solder to the plate 24. The deposits of solder are indicated at 54. A female recess 36 in the pin 34 permits the male pin 58 of the connector 32, in FIGURE 3, to electrically connect with the pin 34 in a detachable manner. The connector 32 in FIGURE 3 is shown by way of example to be screw connected by threads to a conductive shell 60 (FIGURES 3 and 4). The conductive shell 60 may, in turn, be soldered to plate 20 by means of solder illustrated at 64. The pin 34 is, of course, electrically insulated from the shell 60 by suitable spacing or mechanically supporting insulating material (not shown).

In the practice of one form of the present invention in which a complex propagational mode of wave travel throughout the length of the body 10 is desired, which mode is largely characteristic of a TEM mode of propagation having dispersionless characteristics, the axis of the pin 34 is positioned from the end surface 61 of the body 10 by a distance corresponding to approximately one-quarter wavelength of the mean frequency of the band which the waveguide is intended to communicate. The end surface 61 is then provided with a conductive plate or film 62 which is in electrical contact with the plates 20 and 24. Under these conditions the width dimension of the ceramic body 10, indicated by the dimension "W" in FIGURE 3, is preferably greater than one-fifth wavelength but not substantially larger than one-half wavelength of the mean frequency. This dimension is, of course, based upon the wavelength of the signal as propagated in a material having a dielectric constant corresponding to the material comprising the body 10.

It is a noteworthy feature of the present invention, in distinguishig it from prior art waveguide devices, that the propagation of a TEM mode is possible in this structure only by virtue of the fact that two sides of the conductive body are free of any conductive material so that a substantial electric field potential may exist at the boundaries of the body 10 and the atmosphere or environment in which the waveguide is intended to be employed. Furthermore if, in accordance with the present invention, the dielectric constant of the material comprising the body 10 is substantially greater than its environment, considerable reflection of the waves within and against the walls of the body will be enforced. This reflectivity and the degree of this reflectivity is a function of the difference in the dielectric constant of the material and the dielectric constant of its environment. For this reason the width dimension of the waveguide may, when TE type propagation is considered, be substantially less than one-half the wavelength of the wave propagated in the body. In practice, a body of material 10 of titanium dioxide having a width (W) of .15 inch, a height (H) of .125 inch (FIGURE 3) and coated on the surfaces 18 and 22 by a conductive deposit of silver, will result in a waveguide having a bandwidth of over 2000 megacycles in the frequency range of 2200 megacycles to 4200 megacycles. This represents a bandwidth in the order of 60%. Under these conditions, the low frequency cut-off of the waveguide will be found to be approximately 500 megacycles and this low frequency cut-off may be attributable to the lack of total reflection of the wave energy below 500 megacycles within the guide at the boundary of the uncoated walls. These data are based on an operating environment of air. These same characteristics may, of course, be obtained through the use of solid dielectric materials other than titanium dioxide, provided they exhibit a dielectric constant substantially equal to that of titanium dioxide which is in the order of 73.

Although the present invention, when embodied in a helical waveguide device, is not limited to a structure wherein only those surfaces, such as 18 and 22 of the body 10, which lie substantially in planes transverse to the helical axis 12 are rendered conductive, this arrangement is preferred in many cases. By such an arrangement, the pitch of the helix may be made smaller and the over-all axial length of the helix reduced, for any given value of desired time delay. This reduction in the helix pitch results from the shielding effect of the conductive surfaces. When these surfaces are adjacent one another along the axis of the helix, less cross coupling of energy from one turn of the helix to the next is produced than that resulting from the same pitch with the conductive surfaces on the inner and outer peripheries of the helix. In practice it is found that the pitch of the helix should be no smaller than that required to result in a spacing between turns which is 1.5 times the axial dimension of a turn. Thus, in FIGURE 2 the distance D between turns as measured along the direction of the axis 12, should be at least 1.5 times the dimension of each turn, also taken along the axis, such as H in FIGURES 2 and 3.

The novel helical waveguide of the present invention may be usefully supported and adapted for general use in the manner shown in FIGURE 5. Here, the helical waveguide 10 is supported within an electrically conductive container 69 by means of a plastic foam or other low dielectric supporting material 70. The wave coupling devices 15 and 17 are attached to access connectors mounted and held by the container 69 such as shown at 71. In the practice of the present invention, it is found desirable that the spacing between the outer peripheral surfaces of the helix 10 and the inner conductive wall 69a of the container be at least equal to the spacing between adjacent turns of said helical body. This dimension is shown by the arrows 74. If this relationship between the inner wall of the conductive container and the outer periphery of the helix is maintained, any losses attributable to fields extending from the helical body 10 which tend to induce currents in the conductive shield 69 are held to a modest value.

The formation of a helically shaped body of the general form shown in FIGURE 1 of a high dielectric material, such as titanium dioxide, is complicated by the fact that titanium dioxide is quite brittle and hard. Furthermore, ceramic materials such as titanium dioxide are generally formed under conditions of high heat and tend to suffer substantial shrinkage and distortion upon cooling. So far as is known, the present state of the art does not permit of the direct forming of the helical body 10 within sufficient dimensional tolerances to maintain and allow uniform low loss propagation of wave energy along its length when employed as above described. At the present state of the art, it is therefore necessary to employ machining techniques in fashioning the helical body 10. Ceramic materials such as titanium dioxide are, however, quite brittle and hard and must be cut with a high-speed tool, ground with a diamond cutting wheel, or perhaps supersonically fashioned.

In accordance with the present invention, a helical body may be fashioned from material having considerable hardness and brittleness, such as a ceramic comprised of titanium dioxide. In the general case, a cylindrical tube of ceramic material is first produced. The length of the tube is made equal to or larger than the axial length of the helix to be fabricated. The wall thickness of the tube, that is the dimension between the inner and outer surfaces of the tube, is made equal to or greater than the dimension of the desired helical turns as measured along radii of the helix. The inner diameter of the tube must, of course, be not less than the inner diameter, or small radius, of the desired helix. The cylindrical tube is then supported by a first vehicle comprised of a material which is substantially softer and more easily machined than the ceramic. Preferably the supporting material is characterized by not only relative softness but by its ability to adhesively conform to either the inner or outer surfaces of the helical tube in one state and to be easily removed from the surfaces of the ceramic while in another state. Such a material may well be a wax or low-melting temperature mixture of metals. The ceramic tube, while being supported by this first vehicle, is subjected to machining and cutting. The inner and outer surfaces of the tube may, by this technique, be made very smooth and conformed to any dimensional tolerances that might be exacted. After one surface has been machined, a helical cut may be made through the tube wall and into the supporting material. Following this step, the helix having one surface machined to desired tolerance is supported by a second vehicle comprised of a material having different characteristics from the first supporting material so that the first supporting material can be removed from the helix and the ceramic without destroying the supporting relation between the second vehicle and the helix. The other surface of the tube is then machined to tolerance so that when the second supporting material is removed, a ceramic helix having the required dimensions will result.

One way of carrying out the novel procedures envisioned by the present invention in making a solid helix of ceramic material or the like is shown in FIGURES 6 through 11. In FIGURE 6 a cylindrical tube 80 of the ceramic material is arranged for support by a plate 82. A recess 84 in the plate 82 is shaped and dimensioned to accept and support the tube 80. A mandrel 86 is also arranged for support by the plate 82 within the recess 88 thereof. The diameter of the mandrel 86 is such to afford substantial clearance between the outer surface of the mandrel 86 and the inner surface of the tube 80. The tube 80 and the mandrel 86, positioned in and held by the plate 82, are shown in FIGURE 7.

When the tube 80 and the mandrel 86 have been positioned in concentric relation as shown in FIGURE 7, a first supporting material is caused to fill the cavity between the mandrel and the cylinder. This material may be molten wax, a molten metal mix, a dissolved plastic compound, or other substance which can be placed in a liquid state by heat or chemical influence and, when solidified, will give support to the tube 80 in a concentric relation around the mandrel 86. By way of example, a pitcher 90 has been shown in FIGURE 7 with a flow of wax 92 in the process of filling the cavity between the mandrel 86 and the tube 80. It is convenient to use a wax which has a melting point of around 200° F. so that it may later be removed from the cavity by immersing the mandrel, wax and tube combination in boiling water.

As shown in FIGURE 8, after the wax 92 has cooled, the tube 80, supported about the mandrel 86 by the solid wax, may be removed from the supporting plate 82 and placed in a lathe 94. While being rotated by the lathe, the outer surface of the ceramic tube 80 may be worked, machined, and polished so that the outer surface is concentric with respect to the axis of the mandrel 86. Following this, a helical cut may be made in the wall of the tube 80.

FIGURE 9 illustrates the structure resulting from the step illustrated in FIGURE 8, namely, the mandrel 86 concentric about turning center apertures indicated at 96 and 98, the wax 92 which supports the inner surface 100 of what remains of the ceramic tube, with the helical cuts made by the lathe extending through the wall of the tube 80 into the wax material 92 such as shown at 102.

After the machining operation illustrated in FIGURE 8, which results in the structure shown in FIGURE 9, it can be seen that the helical body 10 has been partly fashioned from tube 80 and is supported about the mandrel 86 by the wax 92. It is to be understood that the mandrel 86 and the wax 92 may be considered to form a vehicle which is in effect a single mandrel and that the solid cylinder 86 as such could be dispensed with and the mandrel as a whole be comprised of a hard wax or metal mix.

Figure 10:
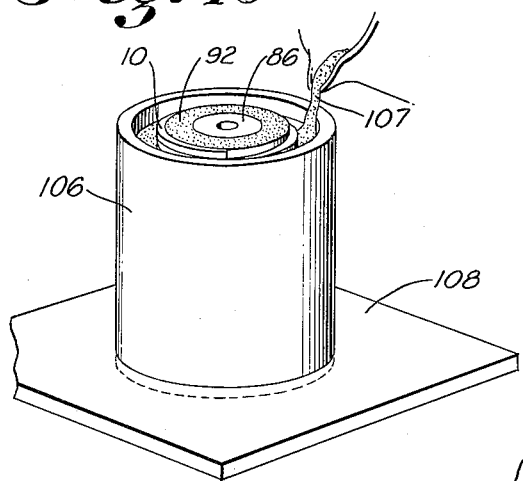
FIGURE 10 is a diagrammatic representation showing of still another step employed in the practice of the present invention in fabricating the helical body shown in FIGURE 1.
Figure 11:
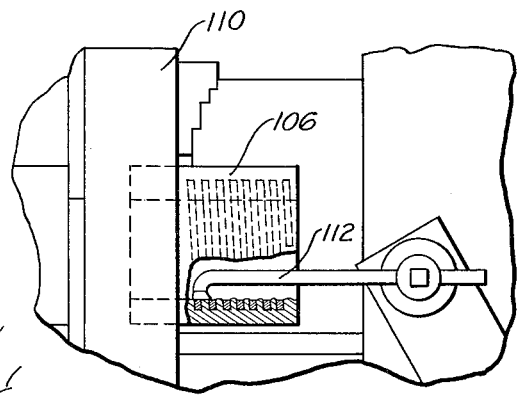
FIGURE 11 is still another step employed in the practice of the present invention in fabricating the helical body shown in FIGURE 1.

The helical body 10 is then transferred to another vehicle comprised of a different body of supporting material which acts upon the outer surfaces 104 of the body. This transfer may be accomplished as shown in FIGURE 10 where the combination shown in FIGURE 9 is inserted into a supporting cylinder 106. Another or second supporting material 107 in liquid form, such as wax of a higher melting temperature, is then poured in between the cavity existing between the supported body 10 and the inner side of the supporting cylinder 106. Supporting cylinder 106, in the combination shown in FIGURE 9, may be held in concentric relation during this pouring process by means of a supporting platform 108 in a manner similar to that shown in FIGURE 6. The supporting material added may have a melting temperature sufficiently high to produce melting of the wax 92 while it itself is cooling and solidifying. Otherwise, the wax 92 may be removed by immersing the cylinder 106, after the second supporting material has cooled, into water having a temperature high enough to melt the wax 92 without liquifying the second supporting material. This will enable the inner supporting mandrel to be removed, as well as the first supporting material or wax 92, leaving the helical body 10 supported within the cylinder 106 by means of the second supporting material. The inner surfaces of the helical body 10 may then be worked or machined to tolerances, as shown in FIGURE 11. Here, the cylinder 106 is supported in a lathe chuck 110, and a tool 112 brought into cutting relation to the inner surface of the helical body 10. Following this, the second supporting material may be melted or otherwise removed to leave a body of ceramic material having the helical form shown in FIGURE 1.

Figure 12:
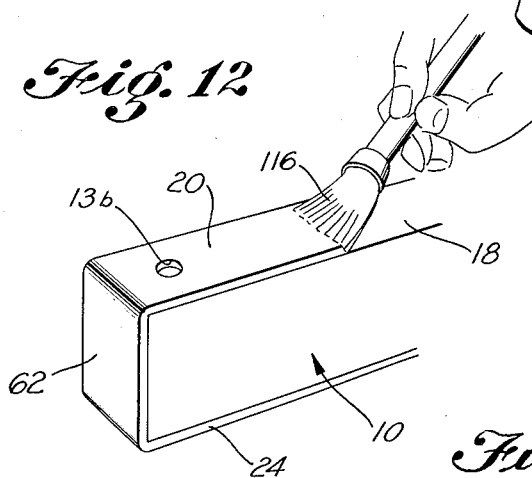
FIGURE 12 is a diagrammatic representation of one step employed in the present invention in adapting the helical body of FIGURE 1 to a waveguide type delay line.

After the helical body 10 has been fashioned, and before or after the drilling of the aperture 13b, the conductive plates 20, 24 and 26 may be affixed to the surfaces thereof. By way of example, this may be accomplished in the manner indicated in FIGURE 12 wherein is shown the manual application of a conductive paint to the helix surfaces. As indicated, this may be done by means of a brush 116. Alternative satisfactory methods of forming the plates may, of course, be employed such as spraying, electro-deposition, electro-plating, etc., or the actual cementing of metal foil to ceramic surfaces.

From the foregoing description of the present invention, it will be readily understood that the waveguide structure depicted in FIGURE 1 through FIGURE 4 is only illustrative of one preferred form of waveguide employing the novel teachings of the present invention. As pointed out above, the arrangement shown in FIGURE 1 through FIGURE 4 is advantageous in that the conductive plates 20 and 24 (FIGURE 4) are affixed to those opposing surfaces of the helical body 10 which effectively lie in helical surfaces generated about the axis 12 (FIGURE 1 and FIGURE 2) so that adjacent surfaces of any two turns of the helix, as encountered in a direction along the axis of the helix, are effectively shielded from one another by the conductive plates. This permits a closer spacing between adjacent turns for a given degree of cross-coupling between turns, as described above. However, if desired, the axial length of the helical waveguide may be suitably increased and, instead, the two conductive plates affixed to the outer and inner peripheral surfaces of the helical body. Furthermore, if the weight of the entire waveguide device is not an important consideration, the fabrication of a helical body comprising high dielectric material may be obviated by suitably affixing conductive plates to the inner and outer peripheral surfaces of a tube comprised of a high dielectric material. In this latter arrangement it is contemplated that either both plates be in strip form or only one plate be conformed to a helical strip affixed to one peripheral surface of the tube, with the second plate comprised of a substantially uniform conductive deposit on the other peripheral surface of the tube.

Figure 13:
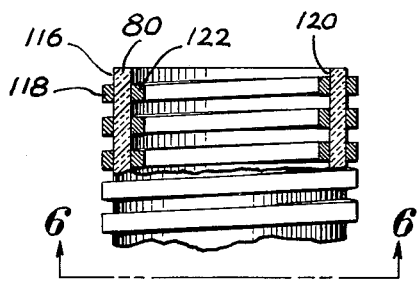
FIGURE 13 is a partially cut-away perspective view of another embodiment of the present invention.

Such an arrangement is shown in FIGURE 13 where the tubular body 80, shown in FIGURE 6, after suitable machining, has affixed to its outer peripheral surface 116 a deposit or strip of conductive material 118. The inner peripheral surface 120 of the tube 80 may then be uniformly treated with a conductive material or alternatively a deposit or strip of conductive material 122 affixed thereto in cooperating relation to the strip 118. In the manufacture of a device such as that shown in FIGURE 13, it is convenient to uniformly coat both surfaces of a tube of high dielectric material, such as 80, with a conductive material, following which the outer surface of the tube is cut or ground away in a manner similar to that shown in FIGURE 8, to leave a deposit of conductive material such as 118 in FIGURE 13. The coupling of energy to such a waveguide device may, of course, be carried out in accordance with the arrangement shown in FIGURE 4.

We claim:
1. A delay line device having substantially sixty percent bandwidth characteristics and a substantially dispersionless wave propagation characteristic for accepting and guiding electromagnetic waves, comprising in combination: an elongated body of ceramic material conformed to a helix and having substantially constant delay characteristics and a relatively high dielectric constant with respect to air; first and second layers of electrically conductive material fixed on opposing surfaces of said body, insulated from one another by said ceramic material and extending the length of said body to end faces thereof; said surfaces being disposed generally in planes transverse to the axis of said helix; said first and second layers of electrically conductive material being spaced apart to provide for the propagation of an electric wave along the length of said body; said electric wave propagated within said body providing a mode establishing a substantial value of electrical field potential at the boundaries defined by outer surfaces of said body directly in contact with a surrounding environment; said body having adjacent each end faces thereof a cylindrical aperture of predetermined diameter; each said aperture being substantially perpendicular to the two surfaces comprising said first and second layers of electrically conductive material; conductor means positioned within each said aperture; said conductor means being of substantially the same shape as each of said apertures but of smaller dimensions; each said conductor means being centered in its respective aperture; electrically conductive means physically coupling each said conductor means to one of said first and second layers of conductive material; a closed container of electrically conductive material surrounding said helix; and a shock absorbing body of electrically insulating material of low dielectric constant conformed around and between the turns of said helix and in shock supporting relation therewith to the interior of said container.

2. Apparatus according to claim 1 wherein the dimensions of said container are so related to the diameter of said helix that the spacing between the outer periphery of said helix and the interior of said container is at least equal to the spacing between adjacent turns of said helix.

3. Apparatus according to claim 1 including electrically conducitve films electrically connecting said first and second layers of conductive material at said body end faces, each of said electrically conductive films being spaced from each aperture a distance substantially equal to one-quarter wavelength of the mean frequency of the electromagnetic energy wave frequency band it is to propagate along and within said body.

4. Apparatus according to claim 3 including an insulating sheath positioned about said conductor means within each said aperture for substantially filling each said aperture between said first and second conduction plates.

References Cited in the file of this patent
UNITED STATES PATENTS

| | | |
|---|---|---|
| 1,568,369 | Everett | Jan. 5, 1926 |
| 2,659,055 | Cohn | Nov. 10, 1953 |
| 2,676,309 | Armstrong | Apr. 20, 1954 |
| 2,734,170 | Engelmann et al. | Feb. 7, 1956 |
| 2,758,285 | Le Vine | Aug. 7, 1956 |
| 2,774,046 | Arditi et al. | Dec. 11, 1956 |
| 2,794,959 | Fox | June 4, 1957 |
| 2,807,875 | Synder | Oct. 1, 1957 |
| 2,821,685 | Whitehorn | Jan. 28, 1958 |
| 2,825,875 | Arditi | Mar. 4, 1958 |
| 2,841,791 | Schlicke | July 1, 1958 |
| 2,923,882 | Bradford | Feb. 2, 1960 |
| 2,929,034 | Doherty | Mar. 15, 1960 |
| 2,943,276 | Lovick | June 28, 1960 |

FOREIGN PATENTS

| | | |
|---|---|---|
| 1,065,478 | France | Feb. 20, 1956 |
| 767,077 | Great Britain | Jan. 30, 1957 |

OTHER REFERENCES

Schlicke: "Quasi-Degenerated Modes in High-E Dielectric Cavities," Journal of Applied Physics, vol. 24, No. 2, February 1953, pages 187–191.

Zublin: I.R.E. Transactions on Microwave Theory and Techniques, volume MTT–3, March 1955, No. 2 special issue, "Symposium on Microwave Strip Circuits," pages 65–74.